US012567584B2

(12) United States Patent
Cooke et al.

(10) Patent No.: US 12,567,584 B2
(45) Date of Patent: Mar. 3, 2026

(54) LITHIUM SULFUR CELL

(71) Applicant: Gelion Technologies Pty Ltd, Eveleigh (AU)

(72) Inventors: Ashley Cooke, Abingdon (GB); Chris Cook, Abingdon (GB); Adrien Amigues, Abingdon (GB); Rachel Lear, Abingdon (GB); Ben Lloyd, Abingdon (GB); Jacob Locke, Abingdon (GB); Steven Rowlands, Abingdon (GB); Angelica Orsi, Abingdon (GB); Sebastian Liatard, Abingdon (GB)

(73) Assignee: Gelion Technologies Pty Ltd, Eveleigh (AU)

( * ) Notice: Subject to any disclaimer, the term of this patent is extended or adjusted under 35 U.S.C. 154(b) by 661 days.

(21) Appl. No.: 17/754,183

(22) PCT Filed: Oct. 15, 2020

(86) PCT No.: PCT/GB2020/052605
§ 371 (c)(1),
(2) Date: Mar. 25, 2022

(87) PCT Pub. No.: WO2021/074634
PCT Pub. Date: Apr. 22, 2021

(65) Prior Publication Data
US 2022/0293925 A1 Sep. 15, 2022

(30) Foreign Application Priority Data

Oct. 15, 2019 (GB) ...................................... 1914929

(51) Int. Cl.
*H01M 4/40* (2006.01)
*H01M 4/02* (2006.01)
(Continued)

(52) U.S. Cl.
CPC ........... *H01M 4/40* (2013.01); *H01M 4/0435* (2013.01); *H01M 4/364* (2013.01); *H01M 4/386* (2013.01);
(Continued)

(58) Field of Classification Search
CPC ........ H01M 4/40; H01M 4/134; H01M 4/364; H01M 10/0569; H01M 10/052;
(Continued)

(56) References Cited

U.S. PATENT DOCUMENTS

2004/0058246 A1* 3/2004 Choi ..................... H01M 4/136
429/231.95
2009/0291366 A1 11/2009 Berkowitz et al.
(Continued)

FOREIGN PATENT DOCUMENTS

CN 109346770 A 2/2019
EP 3016181 A1 5/2016
(Continued)

OTHER PUBLICATIONS

Danner Timo, et al., "Modeling of nano-structured cathodes for improved lithium-sulfur batteries", Electrochimica Acta, Elsevier, Amsterdam, NL, vol. 184, Oct. 23, 2015 (Oct. 23, 2015), pp. 124-133, XP029325624, ISSN: 0013-4686, DOI: 10.1016/J. ELECTACTA.2015.09.143 sections "3.2 Particle model", "3.3 Cell model", "3.4 degradation and battery cycling", "4. Conclusions"; figures 4-10.

*Primary Examiner* — Aiqun Li
(74) *Attorney, Agent, or Firm* — BakerHostetler

(57) ABSTRACT

An electrochemical cell comprising: i. an anode comprising an alkali metal or alkali metal alloy or silicon; ii. a cathode comprising a particulate mixture deposited on a current collector, said particulate mixture comprising electrochemically active sulfur material and electronically conductive
(Continued)

carbon material, wherein the porosity of the cathode is less than 40%; and iii. an electrolyte having a polysulfide solubility of less than 500 mM.

13 Claims, 4 Drawing Sheets

(51) Int. Cl.

| | |
|---|---|
| *H01M 4/04* | (2006.01) |
| *H01M 4/36* | (2006.01) |
| *H01M 4/38* | (2006.01) |
| *H01M 4/58* | (2010.01) |
| *H01M 4/62* | (2006.01) |
| *H01M 10/052* | (2010.01) |
| *H01M 10/0569* | (2010.01) |

(52) U.S. Cl.

CPC ......... *H01M 4/5815* (2013.01); *H01M 4/623* (2013.01); *H01M 4/625* (2013.01); *H01M 10/052* (2013.01); *H01M 10/0569* (2013.01); *H01M 2004/021* (2013.01); *H01M 2300/0028* (2013.01); *H01M 2300/0045* (2013.01)

(58) Field of Classification Search

CPC ... H01M 2004/021; H01M 2300/0028; H01M 2300/0045; H01M 2300/0025

See application file for complete search history.

(56) References Cited

U.S. PATENT DOCUMENTS

| | | | |
|---|---|---|---|
| 2010/0239914 | A1 | 9/2010 | Mikhaylik et al. |
| 2011/0236766 | A1 | 9/2011 | Kolosnitsyn et al. |
| 2012/0189879 | A1 | 7/2012 | Fetzer et al. |
| 2014/0342249 | A1 | 11/2014 | He et al. |
| 2017/0054180 | A1 | 2/2017 | Fukushima et al. |
| 2018/0138503 | A1 | 5/2018 | Kim et al. |

FOREIGN PATENT DOCUMENTS

| | | |
|---|---|---|
| GB | 2412484 A | 9/2005 |
| KR | 1020150142832 A | 12/2015 |
| WO | 2009/143128 A1 | 11/2009 |
| WO | 2015/114074 A1 | 8/2015 |

* cited by examiner

LITHIUM SULFUR CELL

The present invention relates to an electrochemical cell, in particular a lithium-sulfur cell. The present invention additionally relates to a method for forming a cathode for an electrochemical cell, in particular a lithium-sulfur cell.

BACKGROUND

Secondary cells such as lithium-sulfur cells may be recharged by applying an external current to the cell. Rechargeable cells of this type have a wide range of potential applications. Important considerations when developing lithium-sulfur secondary cells include gravimetric and volumetric energy, cycle life and ease of cell assembly. Another example of a secondary cell is a sodium-sulfur cell.

Typically, lithium-sulfur cells contain cathodes with a high porosity (typically 60-80%). The high porosity allows standard electrolytes to penetrate the cathode, and allows effective mass transport in the electrolyte of the cell in order to achieve high sulfur utilisation throughout the cathode. However, volumetric energy densities of such a cell may be relatively low in view of the high porosity of the cathode. Additionally, high porosity cathodes require increased electrolyte loadings ($ml_{electrolyte}/mg_S$) to fully wet the electrode and provide sufficient ionic conductivity, which increases cell weight and reduces gravimetric energy density. A highly porous cathode may also lack robustness, for example when subjected to external pressures.

BRIEF DESCRIPTION OF FIGURES

Various aspects of the invention are described, by way of example, with reference to the accompanying figures, in which.

DESCRIPTION

Figure 1:
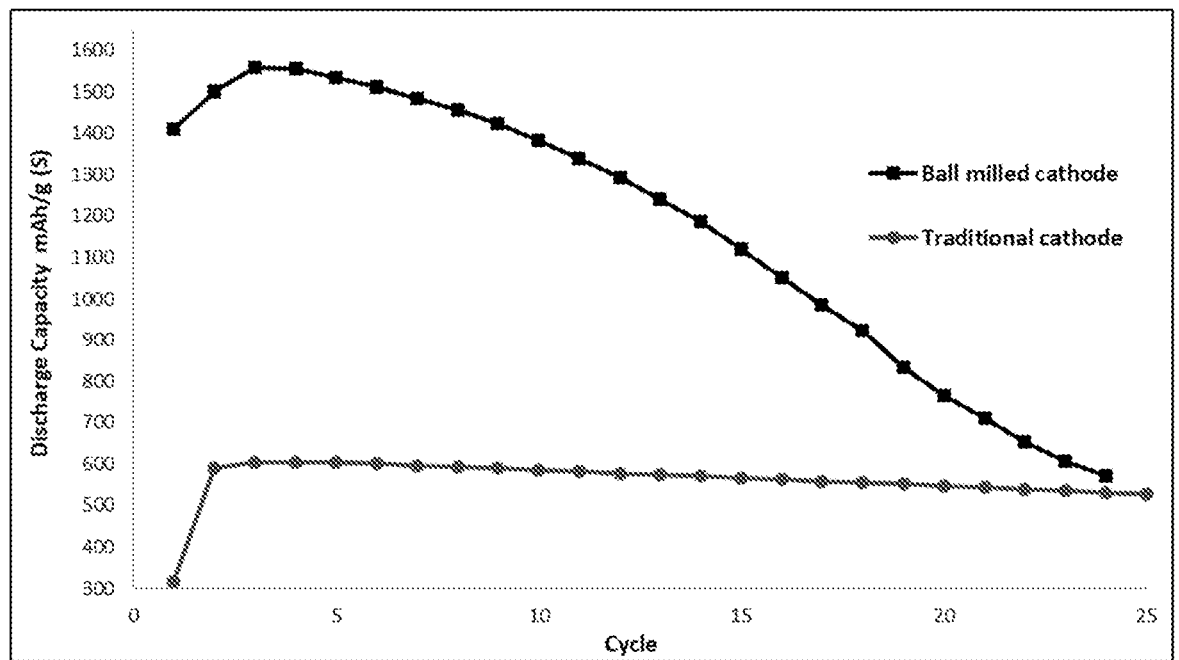
FIG. 1 shows electrochemical performance data of a cell in accordance with an embodiment of the invention in which the cathode material is formed using ball milling, in comparison to a cell in which the cathode material was formed by simple mixing.

Before particular examples of the present invention are described, it is to be understood that the present disclosure is not limited to the particular cells, methods or materials disclosed herein. It is also to be understood that the terminology used herein is used for describing particular examples only and is not intended to be limiting, as the scope of protection will be defined by the claims and equivalents thereof.

In describing and claiming the cell and method of the present invention, the following terminology will be used: the singular forms "a", "an" and "the" include plural forms unless the context clearly dictates otherwise. Thus, for example, "a cathode" includes reference to one or more of such elements.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

In accordance with an aspect of the invention, an electrochemical cell comprising: an anode comprising an alkali metal or metal alloy, or silicon; and a cathode comprising a particulate mixture deposited on a current collector, said particulate mixture comprising electrochemically active sulfur material and electronically conductive carbon material, wherein the porosity of the cathode is less than 40%.

In accordance with one aspect of the invention, there is provided an electrochemical cell comprising:
  i. an anode comprising an alkali metal or alkali metal alloy or silicon;
  ii. a cathode comprising a particulate mixture deposited on a current collector, said particulate mixture comprising electrochemically active sulfur material and electronically conductive carbon material, wherein the porosity of the cathode is less than 40%; and an electrolyte having a polysulfide solubility of less than 500 mM.

In accordance with a further aspect of the invention, there is provided a method for forming a cathode for a lithium-sulfur or sodium-sulfur battery, said method comprising:
  a. combining electrochemically active sulfur material and electronically conductive carbon material; and
  b. grinding the electrochemically active sulfur material and electronically conductive carbon material to reduce the particle diameter to less than 5 μm; and
  c. depositing the resulting mixture onto a current collector, wherein, following deposition of the mixture, the cathode has a porosity of less than 40%.

In one embodiment, there is provided a method for forming a cathode for a lithium-sulfur or sodium-sulfur battery as detailed above, said method comprising:
  a. combining electrochemically active sulfur material and electronically conductive carbon material; and
  b. grinding the electrochemically active sulfur material and electronically conductive carbon material to reduce the particle diameter to less than 5 μm; and
  c. depositing the resulting mixture onto a current collector, wherein, following deposition of the mixture, the cathode has a porosity of less than 40%.

As described above, the cell in accordance with the present invention comprises a cathode having a low porosity, such as a porosity of less than 40%. It has been surprisingly found that the combination of a low porosity cathode with a highly concentrated electrolyte can provide certain advantages to a cell such as a lithium sulfur cell. In particular, high sulfur utilisation may be achieved. In addition, high volumetric energy densities may be achieved, because the low porosity of the cathode can allow a relatively thinner cathode to be used in comparison to a typical high porosity cathode. For example, a cathode such as that used in a lithium-sulfur cell in accordance with the present invention may have a thickness of approximately 50% less than a high porosity cathode for a traditional lithium-sulfur cell. The presence of a low porosity cathode may also allow the cell to withstand external pressures, which may provide various further benefits, for example in relation to cycle life and preserving cell integrity.

In addition, maximising the interface between sulfur and carbon in the cathode may be beneficial, in particular in terms of achieving high sulfur utilisation (which may be close to theoretical capacity).

Anode

Any suitable anode may be employed. Preferably, the anode may comprise an alkali metal, in particular lithium or sodium. In a lithium-sulfur cell, the lithium anode comprises an electrochemically active substrate comprising lithium. The electrochemically active substrate may comprise a lithium metal or lithium metal alloy. Preferably, the electrochemically active substrate comprises a foil formed of lithium metal or lithium metal alloy. Examples of lithium alloys include lithium aluminium alloy, lithium magnesium alloy and lithium boron alloy. Preferably, a lithium metal foil is used. Where the cell is a sodium-sulfur cell, the anode comprises a sodium metal or sodium metal alloy. Preferably, the anode comprises a foil formed of sodium metal or sodium metal alloy. Examples of sodium alloys include sodium aluminium alloy, sodium magnesium alloy and sodium boron alloy. Preferably, a sodium metal foil is used. As an alternative, the anode may comprise silicon, for example a silicon-containing composite such as a carbon-silicon composite. Where the anode comprises silicon, this may be lithiated or sodiated.

A coating on the surface of the anode may be included. At least one or more coating layers may be envisaged. This coating may form an anode protection layer. Such anode coating layer may have beneficial effects on cell performance, for example by reducing inhomogeneous stripping and plating of the alkali metal present in the anode, which may reduce cracks or voids in the anode surface and may provide improvements in cycling and capacity life.

For example, one or more coating layers comprising at least one metal and/or non-metal that can form an alloy with an alkali metal such as lithium or sodium may be employed. The term "alloy" refers to a combination of two or more metals, or a combination of one or more metals with other, non-metallic elements. Examples of suitable alloying metals and non-metals include aluminium, gallium, boron, indium, zinc, carbon, silicon, germanium, tin, lead, antimony, silver, gold, sodium, potassium, magnesium, calcium, and mixtures thereof. The thickness of the coating layer comprising at least one metal and/or non-metal that can form an alloy with an alkali metal such as lithium or sodium may be between 1 nm and 5000 nm, preferably between 10 nm and 3000 nm, for example between 100 nm and 1000 nm. In one embodiment, a coating layer comprising at least one metal and/or non-metal that can form an alloy with an alkali metal is deposited directly on the electrochemically active alkali metal layer.

Additionally or alternatively, one or more ionically conducting coating layers may be included as a part of the anode structure, either directly on the electrochemically active alkali metal layer, or on top of a further coating layer. Said ionically conducting coating layer may have an electronic conductivity of less than $10^{-5}$ S cm$^{-1}$. Thus, this layer may have a low electronic conductivity, i.e. be substantially electronically insulating. The inclusion of a layer with a low electronic conductivity may avoid deposition of alkali metal ions such as Li$^+$ and Na$^+$ on top of a layer comprising at least one metal and/or non-metal that can form an alloy with an alkali metal such as lithium or sodium, where such a layer is present between the ionically conducting coating layer and the anode. Low electronic conductivity may also serve to prevent the ionically conducting coating layer from effectively working as a further current collector within the cell. The ionically conducting coating layer may have an electronic conductivity of less than $10^{-5}$ S cm$^{-1}$, preferably less than $10^{-8}$ S cm$^{-1}$, more preferably less than $10^{-10}$ S cm$^{-1}$. In one example the electronic conductivity is less than $10^{-12}$ S cm$^{-1}$. Said ionically conducting coating layer may have a thickness of between 1 nm and 5000 nm, preferably between 10 nm and 1000 nm, for example between 100 nm and 500 nm.

The ionically conducting coating layer may comprise at least one of a ceramic or glass material, a polymer material, a polymer and ceramic composite material, and combinations thereof. Suitable ceramic or glass materials include, for example, one or more elements selected from lithium, sodium, magnesium, oxygen, phosphorous, nitrogen, silicon, germanium, titanium, zirconium, tin, aluminium, sulfur, boron, selenium, fluorine, chlorine, bromine or iodine. Suitable ceramic materials may be stoichiometric or non-stoichiometric.

The ceramic material may be an oxynitride, sulphide, phosphate, oxide, oxysulfide, thiophosphate, borate, oxyborate, borohydride, silicate, aluminate or thioaluminate compound, or a combination thereof. Examples of suitable materials include lithium oxynitride, lithium sulphide, lithium phosphate, lithium oxide, lithium oxysulfide, lithium thiophosphate, lithium borate, lithium oxyborate, lithium borohydride, lithium silicate, lithium aluminate and lithium thioaluminate, or combinations thereof. Alternatively, the material may be selected from one or more of sodium oxynitride, sodium sulphide, sodium phosphate, sodium oxide, sodium oxysulfide, sodium thiophosphate, sodium borate, sodium oxyborate, sodium borohydride, sodium silicate, sodium aluminate and sodium thioaluminate. The ceramic material may be an amorphous material.

The ionically conducting coating layer may comprise a conductive polymer material, for example an ionically conductive polymer. Additionally or alternatively, the ionically conducting coating layer may comprise a polymer material having an alkali metal salt distributed within the polymer material. This may provide or increase ionic conductivity within the polymer. The ionically conducting coating layer may instead or additionally comprise a polymer-ceramic composite material. A polymer-ceramic composite material may comprise ceramic particles that are bound together by at least one polymer material. The polymer or polymers used to form the polymer-ceramic composite material may have inherent alkali metal ion conductivity, or may be mixed with alkali metal salts.

For example, the polymer material may comprise a lithium salt (e.g. LiTFSI) dissolved within a polymer phase, for example polyethylene oxide. Further examples of lithium salts include lithium hexafluorophosphate, lithium hexafluoroarsenate, lithium nitrate, lithium perchlorate, lithium trifluoromethanesulfonimide, lithium bis(oxalate) borate and lithium trifluoromethanesulphonate. Suitable sodium salts include sodium hexafluorophosphate, sodium hexafluoroarsenate, sodium nitrate, sodium perchlorate, sodium trifluoromethanesulfonimide, sodium bis(oxalate) borate and sodium trifluoromethanesulphonate. Combinations of salts may be employed.

The polymer may comprise at least one functional group selected from the list of amine, amide, carbonyl, carboxyl, ether, thioether and hydroxyl groups, and mixtures thereof. Non-limiting examples of polymers include polyanhydrides, polyketones, polyesters, polystryenes, polyamides, polyimides, polyurethanes, polyolefins, polyvinylenes. Non-limiting examples of ionically conductive polymers may include nitrogen or sulfur containing polymers, for example polypyrroles (PPY), polycarbazoles, polyindoles, polyazepines, polyanilines, polythiophenes, PEDOT, PPS. Further examples of ionically conductive polymers may include poly(fluorene)s, polyphenylenes, polypyrenes, polyazulenes, polynaphthalenes, poly(acetylene)s (PAC) and poly (p-phenylene vinylene) (PPV). In a preferred embodiment, the polymer material is polyethylene oxide.

In a preferred embodiment, the anode is coated with a first layer comprising a metal and/or non-metal that alloys with an alkali metal, and a second layer deposited on the first layer, wherein the second layer is an ionically conducting layer having an electronic conductivity of less than $10^{-5}$ S cm$^{-1}$, wherein the first and second layers are as detailed above. Coatings comprising more than one of either the layer comprising a metal and/or non-metal that alloys with an alkali metal, or the ionically conducting layer, may be envisaged. Additional layers may also be included. Any suitable method may be used to form the coating layer or layers. Examples of suitable methods include physical or chemical deposition methods, such as physical or chemical vapour deposition. For example, plasma-enhanced chemical vapour deposition, sputtering, evaporation, electron-beam evaporation, and chemical vapour deposition (CVD) may be used. Alternative methods of forming coating layers may include ink-jet printing, slot die and spray coating.

Cathode

The cathode of the electrochemical cell comprises a mixture of carbon and sulfur. Any suitable forms of carbon and sulfur may be used in combination. Alternatively, one or more carbon-sulfur composites may be used, optionally in combination with further carbon material(s) and/or sulfur materials(s). The carbon and sulfur mixture may take the form of a particulate mixture deposited on a current collector. The ratio of sulfur to carbon in the cathode may be from 6:4 (60% S, 40% C) to 19:1 (95% S to 5% C), for example from 7:3 to 8:2. In one embodiment, one or more materials comprising carbon may be mixed with one or more materials comprising sulfur. The interface between carbon and sulfur within the cathode can be measured by any suitable method. For example, the interface may be quantified using impedance methods or imaging techniques (e.g. SEM/TEM imaging combined with elemental mapping techniques such as electron energy loss spectroscopy or energy dispersive x-ray spectroscopy). For example, particles may be arranged in the cathode such that the coverage of sulfur on carbon may be greater than 60%, preferably greater than 70%, more preferably greater than 80%, for example greater than 90%. By "interface", this is defined as the coverage of sulfur on carbon particles.

The cathode in the cell in accordance with the present invention has a low porosity. In other words, the amount of space in the cathode relative to the amount of cathode material (such as carbon materials, sulfur materials and binder) is relatively low. By "space" in the cathode, this is space within the cathode that is not comprised of cathode material, and may, for example, be empty space or may be filled with electrolyte. For example, the cathode may have a volume porosity of less than 40%, preferably less than 30%, more preferably less than 15%, for example less than 5%. In one example, the cathode may have a volume porosity of from 5% to 40%, preferably from 10% to 30%, for example between 15% to 25%. Porosity of the cathode can be measured by any suitable method, for example via mercury (Hg) or Brunauer-Emmett-Teller (BET) porosimetry. The thickness of the cathode may be in the range of 10 to 100 µm, preferably 15 µm to 80 µm, for example 20 µm to 50 µm. Given the low porosity of the cathode, high volumetric densities can be achieved. This may allow the thickness of the cathode to be relatively small.

The cathode of the electrochemical cell includes at least one electrochemically active sulfur material. The electrochemically active sulfur material may comprise elemental sulfur, sulfur-based organic compounds, sulfur-based inorganic compounds and sulfur-containing polymers. Preferably, elemental sulfur or $Li_2S$ is used. This material may contain sulfur as well as additional elements such as Li, Na, Mg, P, N, Si, Ge, Ti, Zr, Sn, B, A, F, Cl, Br, I, O or any combination thereof. Examples of sulfur containing materials include LGPS, $Li_3PS_4$, $Li_7P_3S_{11}$ or SPAN (sulfur/polyacrylonitrile). The electrochemically active sulfur material may form 50 to 95 wt %, preferably 70 to 90 wt %, for example 75 to 85 wt % of the total weight of the cathode.

In one embodiment, the cathode comprises a sulfur-carbon composite as electrochemically active sulfur material. Examples of sulfur-carbon composites include carbon nanotube-sulfur, graphene-sulfur, carbon black-sulfur, carbon nanofibers-sulfur or graphene oxide-sulfur. More than one form of carbon and/or more than one form of sulfur may be present in the composite.

In one embodiment, the cathode further comprises a solid electronically conductive material formed of one or more types of carbon. Examples include carbon black, carbon fibre, carbon nanofiber, graphite, graphene, reduced graphene oxide and carbon nanotubes, or combinations thereof. Preferably, carbon black is employed. The electronically conductive carbon material may form 5 to 45 wt %, preferably 10 to 40 wt %, for example 15 to 30 wt % of the total weight of the cathode. Alternatively, where the cathode comprises a sulfur-carbon composite, a further solid carbon material may be absent from the cathode.

In one embodiment, the cathode may further comprise an additive that is ionically conductive, for example one or more ceramic materials, one or more polymeric materials, or mixtures thereof. Without wishing to be bound by theory, such additive may increase the conductivity of lithium/sodium cations within the cathode and would enable smaller overpotential (higher discharge voltage profile, lower charge voltage profile) and higher sulfur utilisations. The ionically conductive material may have a bulk ionic conductivity of greater than $10^{-7}$ S/cm at 25° C., for example greater than $10^{-6}$ S/cm. The ionically conductive material may form 1 to 60 wt %, preferably 5 to 50 wt %, for example 10 to 30 wt % of the total weight of the cathode.

Examples of ionically conductive materials include ceramics such as Li-containing oxides e.g. $Li_{3.3}La_{0.56}TiO_3$; Nasicon structure (eg: $LiTi(PO_4)_3$); $LiSICON(L_{14}Zn$ $(GeO_4)_4)$; $Li_{10}GeP_2S_{12}$; Garnet: $Li_7La_3Zr_2O_{12}$; $Li_2O$; other oxides e.g. $Al_2O_3$, $TiO_2$, $ZrO_2$, $SiO_2$, ZnO; sulfides e.g. $Li_2S$—$P_2S_6$; antiperovskites e.g. $Li_3OCl$; hydrides e.g. $LiBH_4$, $LiBH_4$—$LiX$ (X=Cl, Br, I), LiNH, $LiNH_2$, $Li_3AlH_6$, $Li_2NH$; borates or phosphates e.g. $Li_2B_4O_7$, $Li_3PO_4$, LiPON; carbonates or hydroxides e.g. $Li_2CO_3$, LiOH; fluorides, e.g. LiF; nitrides e.g. $Li_3N$; sulfides e.g. lithium borosulfides, lithium phosphosulfides, lithium aluminosulfides, oxysulfides. At least one of said ceramic materials may be used, or combinations thereof. In a sodium sulfur cell, the sodium ion equivalent of any of these conductive materials may be utilised.

Other examples of ionically conductive materials include polymers such as EO based polymers (for example PEO); acrylate based polymer (for example PMMA); polyamines (polyethyleneimine); siloxanes (poly(dimethylsiloxane)); polyheteroaromatic compounds (e.g., polybenzimidazole); polyamides (e.g. Nylons), polyimides (e.g. Kapton); polyvinyls (e.g. polyacrylamide, poly(2-vinyl pyridine), poly(N-vinylpyrrolidone), poly(methylcyanoacrylate), poly(vinyl acetate), poly (vinyl alcohol), poly(vinyl chloride), poly (vinyl fluoride); inorganic polymers (e.g. polysilane, polysilazane. polyphosphazene, polyphosphonate); polyurethanes; polyolefins (e.g. polypropylene, polytetrafluoroethylene); polyesters (e.g. polycarbonate, polybutylene terephthalate). In one embodiment, co-block polymers such as Nafion may be used. In one embodiment, the cathode contains ceramic particles in combination with one or more ionically conductive polymers.

Optionally, the cathode further comprises a binder. The binder may act to bind the cathode components together. Additionally or alternatively, the binder may also bind the cathode components to an electronically conductive current collector. In doing so, the binder can provide improved mechanical robustness to the cathode, or can improve the processability of the cathode. The binder may be a polymeric binder, for example a polyether such as poly(ethylene oxide)s. polyethylene glycols, polypropylene glycols, polytetramethylene glycols (PTMGs), polytetramethylene ether glycols (PTMEGs), or mixtures thereof.

The binder may be selected from halogenated polymers and more preferably still from fluorinated polymers. Examples of suitable binders include poly(vinylidene fluoride) (PVDF), preferably in the a form, poly(trifluoroethylene) (PVF3), polytetrafluoroethylene (PTFE), copolymers of vinylidene fluoride with either hexafluoropropylene (HFP) or trifluoroethylene (VF3) or tetrafluoroethylene (TFE) or chlorotrifluoroethylene (CTFE), fluoroethylene/propylene (FEP) copolymers, copolymers of ethylene with either fluoroethylene/propylene (FEP) or tetrafluoroethylene (TFE) or chlorotrifluoroethylene (CTFE), perfluoropropyl vinyl ether (PPVE), perfluoroethyl vinyl ether (PEVE) and copolymers of ethylene with perfluoromethyl vinyl ether (PMVE) or blends or mixtures thereof.

Other examples of suitable binders include polyacrylonitrile, polyurethane, PVDF-acrylic co-polymer; polyacrylic acid, polyimides and polyvinyl alcohol. Further suitable binders include rubber (e.g. styrene butadiene rubber), cellulose (e.g. carboxymethyl cellulose) or gelatine.

In some examples, the binder is selected from at least one of PEO, PVDF, Nafion, polypyrole, polythiophene, polyaniline, polyacetylene, polyphenylene vinylene, poly(3,4-ethylenedioxythiophene) and polyphenylene sulphide. For example, the binder may comprise a polyethylene oxide, or PVDF.

The cathode may comprise 0.05 to 20 weight % binder based on the total weight of the cathode, preferably 0.5 to 10 weight %, for example 1 to 5 weight %, for example 2 to 3 wt %.

Electrolyte

Any suitable electrolyte may be included within the electrochemical cell. The electrolyte in accordance with the present invention has a low solubility for polysulfides, or in some cases the electrolyte may not dissolve polysulfides. The electrolyte may have a polysulfide solubility of less than 500 mM at room temperature (20° C.). For example, the electrolyte may have a polysulfide solubility of less than 400 mM, preferably less than 200 mM, more preferably less than 150 mM, for example less than 100 mM, for example less than 10 mM, for example less than 1 mM at room temperature. Correspondingly, the electrolyte may have a low solubility for sulfur-containing species (such as polysulfides and sulfur) in general. For example, the electrolyte may have a sulfur solubility of less than 500 mM at room temperature (20° C.). For example, the electrolyte may have a polysulfide solubility of less than 400 mM, preferably less than 200 mM, more preferably less than 150 mM, for example less than 100 mM, for example less than 10 mM, for example less than 1 mM at room temperature.

The use of an electrolyte having poor or no solubility of polysulfides, for example the use of an electrolyte containing lithium salts at a concentration close to saturation concentration, can inhibit polysulfide shuttle within an electrolyte, and is therefore beneficial in cells such as lithium-sulfur cells. The polysulfide shuttle effect is undesirable due to the resultant loss of coulombic efficiency. Without wishing to be bound by theory, a high concentration of electrolyte, and the presence of lithium (or sodium) salts at a concentration close to saturation concentration, allows only a small amount of polysulfides to dissolve in the electrolyte, which means that little or no polysulfide shuttling is able to occur. The concentration of alkali metal salts within the electrolyte may mean that the electrolyte has a low solubility for polysulfides. Alternatively, electrolytes such as ionic liquids may have poor or no solubility of polysulfides.

The use of electrolytes with low polysulfide/sulfur solubility in combination with high porosity cathodes tends to result in a poor electrochemical performance. This is due to low utilisation of active sulfur species. This may result from the inability of the intermediate sulfur species (polysulfides) to be solvated by the electrolyte. In view of this, it may be beneficial to operate a cell comprising an electrolyte with low polysulfide/sulfur solubility via a solid-state mechanism, i.e. via the formation of solid (unsolvated) polysulfide species. In such solid-state mechanism, a traditional highly porous cathode may have insufficient transport of lithium ion to the active sulfur species present in the cathode, and/or an insufficient sulfur/carbon interface to enable high sulfur utilisations via a solid state mechanism.

However, the combination of a low porosity cathode with an electrolyte with poor polysulfide solubility may mitigate this issue via the formation of solid polysulfide species that remain in the cathode. The sulfur utilisation via a solid-state mechanism may in addition be improved where the carbon/sulfur interface is high (which may not be the case in a highly porous standard cathode). In the present invention, an electrolyte with poor polysulfide solubility, for example an electrolyte containing salts at a concentration close to the saturation concentration of the electrolyte, may be efficiently used in combination with a solid-state cathode (low porous, dense cathode).

The combination of electrolyte and cathode in accordance with the present invention may also allow low volumes of electrolyte to be employed in a cell, despite the low solubility of polysulfides within the electrolyte system. In a traditional lithium-sulfur cell, an electrolyte with a high solubility for lithium polysulfide species is required, and the capacity of such a cell is dependent on the solubility, and therefore the electrolyte volume available within the cell. Highly concentrated electrolytes have a low solubility for polysulfide intermediates. Thus, if a highly concentrated electrolyte is used in combination with a traditional cathode, much more electrolyte is required to achieve a high capacity, as much more electrolyte is required to solubilise the active material. A larger volume of electrolyte is disadvantageous as it increases the size and weight of the cell and results in a low specific energy. In this invention, the formation of solid polysulfide species may not require large volumes of electrolytes. Furthermore, the low porosity of the cathode decreases the cathode/electrolyte interface and further decreases the need for large electrolyte volumes. A cell in accordance with an embodiment of the invention may therefore have an electrolyte loading of <2 μL/mAh, preferably <1.5 μL/mAh, for example <1 μL/mAh. This is in comparison to a standard lithium-sulfur cell which may have a typical electrolyte loading of >2 μL/mAh.

The electrolyte may comprise one or more alkali metal salts, for example lithium or sodium metal salts. The lithium or sodium salt may be present in the electrolyte at a high concentration, i.e. at a level close to the saturation concentration of the electrolyte. For example, the concentration of lithium or sodium salt or salts in the electrolyte may be within the range of 0.05 M to 10 M, preferably, 1 M to 5 M, for example, 3 M. The concentration of the at least one lithium or sodium salt in the solvent may be at least 75% of the saturation concentration of the solvent system, preferably at least 80% of the saturation concentration of the solvent, for example at least 85% of the saturation concentration of the solvent, for example at least 90% of the saturation concentration of the solvent. In one example, the concentration of the solvent is about 100% of the saturation concentration, i.e. the electrolyte may be fully saturated.

The term "saturation concentration" is the extent of solubility of a particular substance in a specific solvent. When the saturation concentration is reached, adding more solute (for example, more lithium salt) does not increase the concentration of the solution. Instead, the excess solute precipitates out of solution. The saturation concentration is determined at room temperature, for example at 20° C. The saturation concentration of polysulfides within a particular solvent may be determined by known methods, for example by determining the point at which just enough electrolyte is added to dissolve all solid residues.

In a typical lithium-sulfur cell, in which the electrolyte has a high polysulfide solubility, polysulfide shuttle may occur. Where there is a high solubility of polysulfides within the electrolyte, this polysulfide shuttle can affect cycling performance and may reduce coulombic efficiency. To prevent or limit the effect of polysulfide shuttle, certain additives may be included in the electrolyte of such a typical lithium-sulfur cell, for example certain additives including N—O bonds. An example of such a sacrificial additive is LiNO₃. However, these additives have certain disadvantages, such as depletion during cell operation and causing cell swelling due to formation of gases during cycling, particularly at higher temperatures. This may have safety implications, as well as an adverse effect on cycle life. The use of additives such as LiNO₃ to suppress redox shuttle of soluble polysulfides may also limit the voltage range of the cell; for example, the use of LiNO₃ additive may limit the discharge voltage to 1.8V (reduction potential of LiNO₃). The cell in accordance with the present invention may reduce or prevent polysulfide shuttle without the use of additives such as LiNO₃. Preferably, the electrolyte in accordance with the present invention does not comprise sacrificial additives. In a preferred embodiment, the electrolyte does not contain additives comprising N—O bonds, for example LiNO₃.

Any suitable solvent system or liquid or gel or mixture of liquids and/or gels may be used for the electrolyte. The electrolyte is liquid across the range of operating temperatures of the cell, which may be from −30 to 120° C., preferably from −10 to 90° C., for example from 0 to 60° C. Operating pressures of the cell may be from 5 mbar to 100 bar, preferably from 10 mbar to 50 bar, for example 100 mbar to 20 bar. In one example, the cell may be operated at room temperature and pressure. The high concentration of the electrolyte in accordance with the present invention means that the electrolyte has a lower vapour pressure than a standard electrolyte. Thus, the cell in accordance with the present invention may perform better than a standard lithium-sulfur cell at a low pressure. The liquid electrolyte may be a gel electrolyte.

Suitable organic solvents for use in the electrolyte are ethers (e.g. linear ethers, diethyl ether (DEE), diglyme (2-methoxyethyl ether), tetraglyme, tetrahydrofuran, 2-methyltetrahydrofuran, dimethoxyethane (DME), dioxolane (DIOX)); carbonates (e.g. di methylcarbonate, diethylcarbonate, ethylmethylcarbonate, methylpropylcarbonate, ethylene carbonate (EC), propylene carbonate (PC); sulfones (e.g. dimethyl sulfone (DMS), ethyl methyl sulfone (EMS), tetramethyl sulfone (TMS)); esters (e.g. methyl formate, ethyl formate, methyl propionate, methyl propylpropionate, ethylpropylpropionate, ethyl acetate and methyl butyrate); ketones (e.g. methyl ethyl ketone); nitriles (e.g. acetonitrile, proprionitrile, isobutyronitrile); amides (e.g. dimethylformamide, dimethylacetamide, hexamethyl phosphoamide, N, N, N, N-tetraethyl sulfamide); lactams/lactones (e.g. N-methyl-2-pyrrolidone, butyrolactone); ureas (e.g. tetramethylurea); sulfoxides (e.g. dimethyl sulfoxide); phosphates (e.g. trimethyl phosphate, triethyl phosphate, tributyl phosphate); phosphoramides (e.g. hexamethylphosphoramide). Further suitable solvents include toluene, benzene, heptane, xylene, dichloromethane, and pyridine.

Any of the ethers, carbonates, sulfones, esters, ketones, nitriles, amides, lactams, ureas, phosphates, phosphoramides may be fluorinated. An example of a fluorinated ether is 1,1,2,2,-tetrafluoroethyl-2,2,3,3-tetrafluoropropyl ether.

Any combination of one or more of the above solvents may be included in the electrolyte.

In an alternative embodiment, the electrolyte may comprise one or more ionic liquids as solvent. Said ionic liquids may comprise salts comprising organic cations such as imidazolium, ammonium, pyrrolidinium, and/or organic anions such as bis(trifluoromethanesulfonyl)imide TFSI⁻, bis(fluorosulfonyl)imide FSI⁻, triflate, tetrafluoroborate BF₄⁻, dicyanamide DCA⁻, chloride Cl⁻. The ionic liquid is liquid at room temperature (20° C.). Examples of suitable ionic liquids include (N,N-diethyl-N-methyl-N(2methoxyethyl)ammonium bis(trifluoromethanesulfonyl), N,N-Diethyl-N-methyl-N-propylammonium bis(fluorosulfonyl)imide, N,N-Diethyl-N-methyl-N-propylammonium bis(fluorosulfonyl)imide, N,N-dimethyl-N-ethyl-N-(3-methoxypropyl)ammonium bis(fluorosulfonyl)imide, N,N-dimethyl-N-ethyl-N-(3-methoxypropyl)ammonium bis(trifluoromethanesulfonyl)imide, N,N-Dimethyl-N-ethyl-N-benzylAmmonium bis(trifluoromethanesulfonyl)imide, N,N-Dimethyl-N-Ethyl-N-Phenylethylammonium bis(trifluoromethanesulfonyl)imide, N-Ethyl-N,N-dimethyl-N-(2-methoxyethyl)ammonium bis(fluorosulfonyl)imide, N-Ethyl-N,N-dimethyl-N-(2-methoxyethyl)ammonium bis(trifluoromethanesulfonyl)imide, N-Tributyl-N-methylammonium bis(trifluoromethanesulfonyl)imide, N-Tributyl-N-methylammonium dicyanamide, N-Tributyl-N-methylammonium iodide, N-Trimethyl-N-butylammonium bis(trifluoromethanesulfonyl)imide, N-Trimethyl-N-butylammonium bromide, N-Trimethyl-N-hexylammonium bis(trifluoromethanesulfonyl)imide, N-Trimethyl-N-propylammonium bis(fluorosulfonyl)imide, N-Trimethyl-N-propylammonium bis(trifluoromethanesulfonyl)imide, (N,N-diethyl-N-methyl-N(2methoxyethyl)ammonium bis(fluorosulfonyl)imide, 1-Butyl-1-methylpyrrolidinium bis(fluorosulfonyl)imide, 1-Ethyl-3-methylimidazolium bis(fluorosulfonyl)imide, 1-Methyl-1-(2-methoxyethyl) pyrrolidinium bis(fluorosulfonyl)imide, N,N-Diethyl-N-methyl-N-propylammonium bis(fluorosulfonyl)imide, N-Ethyl-N,N-dimethyl-N-(2-methoxyethyl)ammonium bis(fluorosulfonyl)imide, N-propyl-N-methylpiperidinium bis(fluorosulfonyl)imide, N-Trimethyl-N-butylammonium bis(fluorosulfonyl)imide, N-methyl-N-butyl-piperidinium bis(trifluoromethanesulfonyl) imide, N-methyl-N-propylpyrrolidinium bis(trifluoromethanesulfonyl)imide and combinations thereof.

Alternatively or additionally, the liquid electrolyte may be a gel electrolyte. The gel electrolyte may comprise polyethylene oxide with a gelling liquid electrolyte, for example an ether such as dimethyl ether. In one example, the electrolyte may comprise polyethylene oxide in combination with LiTFSI in dimethylether.

Any combination of the above solvents may be employed in the electrolyte. For example, the electrolyte may comprise the combination of an ionic liquid with a fluorinated ether, or the combination of an ionic liquid within a gel, or the combination of a fluorinated ether within a gel. Any other combination of two or more of the liquids and/or gels detailed above may be envisaged.

In a preferred embodiment the solvent is an ether, for example dimethoxyethane (DME), dioxolane (DIOX), diglyme, triglyme, tetraglyme or a mixture thereof. In another preferred embodiment the solvent is a fluorinated ether.

Suitable alkali metal salts for inclusion in the electrolyte include lithium or sodium salts. Suitable lithium salts include lithium hexafluorophosphate, lithium hexafluoroarsenate, lithium nitrate, lithium perchlorate, lithium trifluoromethanesulfonimide, lithium bis(trifluoromethanesulfonyl)imide, lithium bis(fluorosulfonyl)imide, lithium bis(oxalate) borate and lithium trifluoromethanesulphonate. Suitable sodium salts include sodium hexafluorophosphate, sodium hexafluoroarsenate, sodium nitrate, sodium perchlorate, sodium trifluoromethanesulfonimide, sodium bis(trifluoromethanesulfonyl)imide, sodium bis(fluorosulfonyl)imide, sodium bis(oxalate) borate and sodium trifluoromethanesulphonate. Preferably the lithium salt is lithium trifluoromethanesulphonate (also known as lithium triflate). Combinations of salts may be employed. For example, lithium triflate may be used in combination with lithium nitrate. The lithium salt may be present in the electrolyte at a concentration of 0.1 to 6M, preferably, 0.5 to 3M, for example, 1M.

Cell

The cell in accordance with the present invention is a lithium-sulfur or sodium-sulfur cell. Accordingly, a cell in accordance with the present invention provides a lithium-sulfur or sodium-sulfur cell comprising a cathode as described herein, an anode as described herein, and an electrolyte as described herein. Optionally, a separator may be positioned between the cathode and the anode. For example, when assembling the cell, a separator may be placed on the cathode and a lithium or sodium anode placed on the separator. Electrolyte may then be introduced into the assembled cell to wet the cathode and separator. Alternatively, the electrolyte may be applied to the separator, for example, by coating or spraying before the anode is placed on the separator. The separator may be formed of a mesh formed of a polymeric material, for example polypropylene, nylon and polyethylene.

A cell in accordance with the present invention may be provided in a suitable housing. This housing can define the electrochemical zone. In one embodiment the housing is flexible, for example a flexible pouch. The pouch may be formed of a composite material, for example a metal and polymer composite. In one embodiment, one or more cells is enclosed in the housing. The cell or cells may be sealed in the housing. A region of each of the cell or cells may protrude from the housing. This region may be coupled to a contact tab formed of, for example, nickel. The contact tab may be connected to the alkali metal or alkali metal alloy by any suitable method, for example by (ultrasonic) welding. Alternatively, the contact tab itself may protrude from the housing. Where a plurality of electrochemical cells are present in the cell assembly, a region of each of the electrodes may be pressed or coupled together to form a pile of electrodes that may be connected to a contact tab.

Method

The cathode starting materials may be combined by any suitable method. Preferably, the method comprises grinding the starting material or starting materials to result in a small particle size, in addition to providing effective mixing and a high interface between the resulting particles. For example, impact of particles within the starting materials with each other and/or with other objects (such as balls, in ball milling; or bead milling) reduces particle size. Suitable methods include ball milling, bead milling, melt infusion, co-extrusion or jet milling, or combinations thereof. In a preferred embodiment, the cathode is produced by bead milling. Without wishing to be bound by theory, it is believed that methods such as ball milling, bead milling, melt infusion, co-extrusion or jet milling may result in a cathode having high sulfur/carbon interface, which may facilitate the use of low porosity cathodes in accordance with the present invention. The cathode materials may first be mixed by a simple mixing process before any of the methods above are employed. An optional binder may be added either before or after the mixing processes detailed below.

Bead milling is performed in a milling chamber in which grinding beads grind the cathode materials to provide a reduced particle size. Bead milling may be performed on dry cathode materials, or optionally wet grinding may be performed if a solvent is also present. Ball milling is performed in a ball mill. Ball milling is performed in a ball mill. In a ball milling, the ball mill is rotated such that balls (made of, for example, steel, titanium, agate, ceramic or rubber) inside the mill impact with the cathode materials. Jet milling is performed in a jet mill. A jet mill grinds and mixes the cathode materials by using a jet of compressed air or inert gas to impact the materials into each other. Milling can be performed over a time period of between 1 minute to 48 hours, preferably 10 minutes to 24 h, more preferably 25 minutes to 10 hours, for example 25 min to 4 h. The speed of rotation of the ball mill can range from 50 rpm to 1,000 rpm, preferably 250 to 750 rpm, for example 350 to 500 rpm. An example of a suitable ball mill is a Fritsch Pulverisette 6' planetary mon mill.

Following the processes detailed above, the particle size may be reduced. Final particle size may be within the range of up to 10 $\mu$m, preferably up to 5 $\mu$m, for example up to 3 $\mu$m. Particle sizes may fall within the range of 0.5 $\mu$m to 10 $\mu$m, preferably 2 $\mu$m to 5 $\mu$m, for example 3 $\mu$m to 4 $\mu$m. By particle size, it is meant the maximum length of the particle in any direction. For example, the particle diameter may be within the range of up to 10 μm, preferably up to 5 μm, for example up to 3 μm.

Following the processes detailed above, additional electronically conductive additives such as carbon black and/or ionically conductive additives such as LGPS may be added to the electrochemically active sulfur/carbon mixture. Further mixing may take place to distribute the additives throughout the electrochemically active sulfur/carbon mixture.

Following combination of the cathode starting materials, the mixture may be processed via any suitable process to result in a suitable cathode e.g. mixed with solvent (e.g. water or organic solvent) and optional binder to form a slurry. The slurry is applied to a current collector and then dried to remove the solvent. Alternatively, the cathode may be coated via a dry process (e.g. via extrusion). The resulting structure may then be cut into the desired shape to form a cathode. The thickness of the resulting cathode may be in the range of 1 to 100 μm, preferably 15 to 80 μm, for example 20 to 50 μm.

The cathode may optionally be pressed or, preferably, calendared in order to reach low porosity. Where calendaring is performed, the cathode may be passed through e.g. rollers one or more times, preferably 1 to 5 times, for example 1 to 2 times. The rollers may be made of any suitable material, for example steel, glass or ceramics. A force may be applied on the rollers of 0 kN to 100 kN, preferably 0 to 80 kN, for example 20 to 80 kN. Heating may optionally be applied to the rollers, whereby the temperature of the rollers range from 20 to 80° C. During calendaring or pressing, the thickness of the cathode will be decreased. The thickness of the cathode following calendaring or pressing may be from 1 to 50 μm, preferably 10 to 40 μm, for example 15 to 30 μm. Calendaring or pressing the cathode may increase interfacial contact between carbon and sulfur. Calendaring or pressing the cathode may additionally or alternatively decrease the final porosity of the cathode. Calendaring may also result in smoothing and compressing of the cathode. Thus, extension of cycle life can be achieved via calendaring of cathodes to lower porosity, without compromising cell utilisation.

A cell in accordance with the present invention, or an assembly of one or more, for example two or more cells in accordance with the present invention, may be subjected to a force. Preferably, the force is an anisotropic force i.e. has a different value when measured in different directions. A component of the force is applied, for example is normal to, an active surface of the anode of the electrochemical cell. In one embodiment, the force is applied continuously to the cell. In one embodiment, the force is maintained at a particular value. Alternatively, the force may vary over time. The force may be applied across the entire surface of the anode. Alternatively, the force may be applied over a portion of the surface of the anode, such as over at least 80% of the surface, preferably over at least 60%, preferably over at least 40% of the surface, for example over at least 20% of the surface. The force may be applied directly to the cell. Alternatively, the force may be applied to one or more plates, for example metal plates, that are situated outside of the cell. The force may be applied externally to the housing in which one or more cells is contained. For example, one or more cells may be contained within a flexible pouch, and a force may be applied externally to the flexible pouch.

The force may enhance the performance of an electrochemical cell. For example, application of a force may extend the cycle life of the cell. Without wishing to be bound by any theory, it is believed that the structure of the cathode as described herein can allow for the use of pressure during cell cycling. Application of pressure to cells having a high porosity cathode may not be beneficial in that the cathode material may be relatively weak, and some of the cathode structure may be lost under external pressure, thus reducing the cell lifetime. However, the structure of the cathode in accordance with the present invention may be maintained under pressure due to its lower porosity. In other words, the structure of the cathode is more robust. The method of manufacture (for example, calendaring or pressing of the cathode) may also enable the cathode structure to be maintained under pressure during cycling.

In addition, the cycle life of Li—S cells is limited by Li-metal anode degradation. The application of external pressure is known to attenuate the degradation of Li metal anodes. Cycling under applied pressure is thus desirable for extended cycle life of Li-metal anodes and for maintenance of protection layers for Li metal anodes. This translates into extended cycle life of the cell. This similarly applies to sodium-sulfur and silicon-sulfur cells.

In addition, the application of pressure may help to preserve the integrity of the cathode. During cycling, a cathode may undergo volume expansion due to swelling of the cathode. This expansion may reduce the carbon-sulfur interface and/or increase the porosity within the cathode, which may then result in a reduction in cycle life. Application of external pressure to the cell may prevent or limit such expansion, thus preserving the cathode structure.

Application of pressure during cell cycling can also enable the use of an anode comprising a protection layer. As detailed above, the anode may comprise a protection layer that may include at least one of a layer that comprises a metal and/or non-metal that alloys with an alkali metal, and a layer that is an ionically conducting layer having an electronic conductivity of less than $10^{-5}$ S cm$^{-1}$, or combinations of one or more of either of said layers. The application of pressure to the cell, in particular to the anode, may enable formation of alkali metal plating below the protection layer, i.e. between the protection layer and the alkali metal/ metal alloy of the anode. This may avoid or reduce the formation of plating on top of the protection layer, which may be inhomogeneous and may result in cracking or pitting on the surface. When plating occurs under the protection layer, the smooth surface of the anode may be preserved, and the formation of cracks or voids on the surface may be reduced. Dendrite formation may then be prevented.

In one embodiment, the force may be a clamping force. Alternatively, the force may be a compression force. The clamping force may be applied to the cell using a clamp. Alternatively, one or more constricting elements may be positioned around the exterior of the cell or cells. The constricting element may take the form of a band or tubing that surrounds at least part of the exterior of the cell or cells. The band may be made of any suitable material. In one embodiment, the band is formed of an elastic material that may be stretched around the cell or cells and, when in position, applies a constricting force. In one embodiment, the band is an elastic band. Alternatively, the band may be tightened around the cell or cells. The constricting element may also take the form of a shrink wrap material. In a further arrangement, one or more compression springs may be used, for example the cell or cells may be contained within a containment structure in which one or more compression springs are located between the containment structure and the cell. Other means of applying force can include screws or weights.

One or more of the above methods of applying a force may be employed. Any suitable force of greater than 0 MPa may be used. The force applied to the cell or cells may be within the range of up to 0.5 MPa, preferably up to 2 MPa, for example up to 5 MPa. The force may be at least 0.1 MPa, preferably at least 0.5 MPa, for example at least 1 MPa. The force may be between 0.1 MPa and 5 MPa, preferably between 0.5 MPa and 3 MPa, for example between 1 MPa and 1.5 MPa.

EXAMPLES

Example 1

A low porosity cathode (positive electrode) was produced. The low porosity cathode comprised 60 wt. % sulfur as active material, 25% wt. % carbon black and 15 wt. % PEO as a binder. The cathode powder was prepared by dry ball milling of sulfur and carbon at 400 rpm for 4 hours, resulting in a high degree of interfacial contact between sulfur and carbon. The binder was added in a second step to form an aqueous slurry which was coated onto an aluminium based current collector to form a cathode.

A comparative "traditional" high porosity cathode was formed comprising 60 wt. % sulfur as active material, 25% wt. % carbon black and 15 wt. % PEO as a binder. The cathode powder was prepared by simple agitation and mixing methods with the use of a three-roll mill. The binder was added in a second step to form an aqueous slurry which was coated onto an aluminium based current collector to form a cathode.

Both cells comprised a liquid electrolyte containing a lithium salt at a concentration above 75% of its saturation concentration. Said liquid electrolyte consisted of LiTFSI dissolved within Dioxolane (DIOX) to a molar concentration of 3 M. Lithium metal foil was utilised as the negative electrode. The liquid electrolyte component was held within an inert separator placed between the electrodes.

As shown in FIG. 1, the electrochemical performance of a lithium sulfur cell with a "traditional" highly porous cathode (60-80% porosity) prepared by standard mixing processes, is compared to that of a low porosity (<40%) cathode, prepared via ball milling.

Each of the cells was cycled between 1.0 and 3.0 V under an applied current equivalent to a rate of C/10 based upon the total sulfur content of the cathode, measured by mass, and assuming the theoretical capacity of sulfur to be 1672 mA h $g_{-1}$.

Utilisation of the active material is poor in the traditional highly porous cathode. Utilisation is markedly improved in the low porosity cathode with a high degree of interfacial contact between sulfur and carbon.

Example 2

A cathode (positive electrode) comprising 60 wt. % sulfur as active material, 25% wt. % carbon black as a conductive additive and 15 wt. % PEO as a binder was provided. The cathode powder was prepared by dry ball milling of the sulfur and carbon at 400 rpm for 4 hours, resulting in a high degree of interfacial contact between sulfur and carbon. The binder was added in a second step to form an aqueous slurry which was coated onto an aluminium based current collector to form a cathode. "Uncalendared cathodes" were used as is, without any further processing steps. "Calendared cathodes" were calendared at room temperature in a secondary processing step. The cathodes were calendared between rollers with an applied force of 80 kN.

Cells were produced comprising said cathodes. These cathodes contained a liquid electrolyte containing a lithium salt at a concentration above 75% of its saturation concentration. The liquid electrolyte consisted of LiTFSI dissolved within Dioxolane (DIOX) to a molar concentration of 3 M. Lithium metal foil 100 micron thick was utilised as the negative electrode (anode). The liquid electrolyte component was held within an inert separator placed between the electrodes.

Figure 2A:
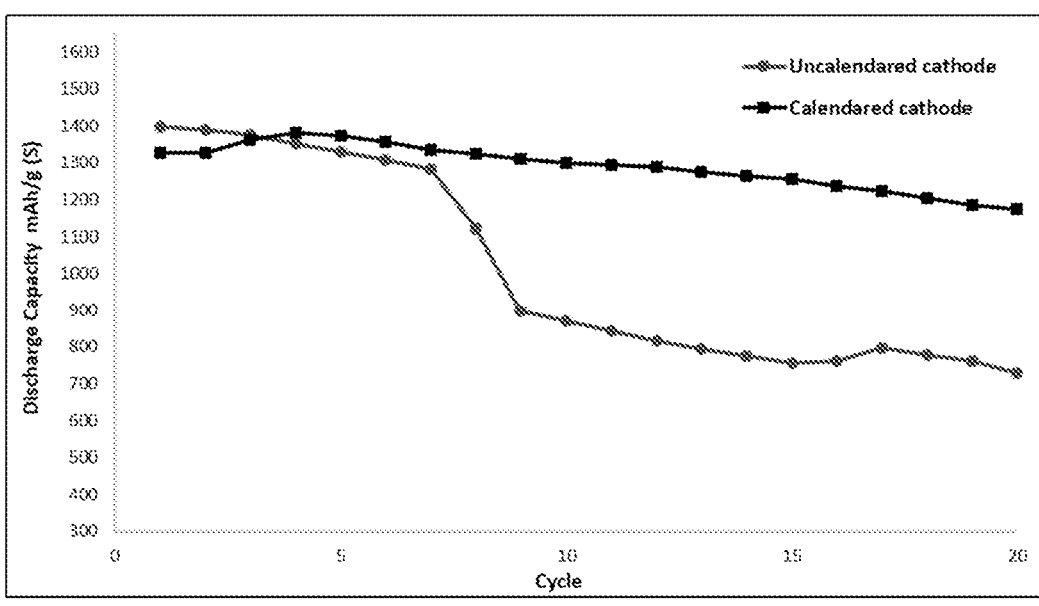
FIG. 2a shows electrochemical performance data of a cell in accordance with an embodiment of the invention in which a calendared cathode is employed, in comparison to a non-calendared cathode.

FIG. 2*a* demonstrates that the cell comprising the calendared cathode exhibits reduced capacity fade and thus extended cycle life than the comparable non-calendared cathode, when cycled with an electrolyte with no or low polysulfide solubility. The cell was cycled between 1.0 and 3.0 V under an applied current equivalent to a rate of C/10 based upon the total sulfur content of the cathode, measured by mass, and assuming the theoretical capacity of sulfur to be 1672 mA h $g_{-1}$.)

Figure 2B:
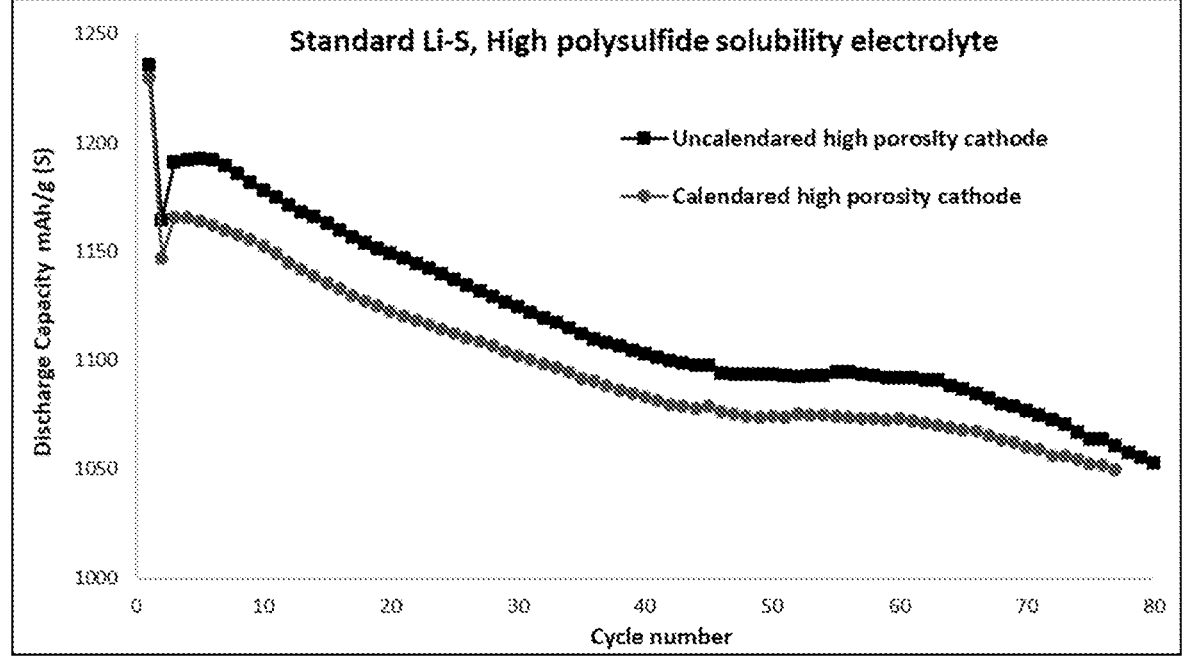
FIG. 2b shows electrochemical performance data of a cell in which a calendared traditional (high porous) cathode is employed, in comparison to a non-calendared high porosity cathode.

FIG. 2*b* demonstrates the negative impact of calendaring on utilisation of active material upon high porosity cathodes in a "traditional" Li—S system using a high polysulfide solubility electrolyte. Additionally, calendaring of cathodes provides no benefit of attenuation of capacity fade or extension of cycle life in this system.

The cathodes described in FIG. 2*b* (positive electrode) comprised 60 wt. % sulfur as active material, 25% wt. % carbon black and 15 wt. % PEO as a binder. The cathode powder was prepared by simple agitation and mixing methods with the use of a three-roll mill. The binder was added in a second step to form an aqueous slurry which was coated onto an aluminium based current collector to form a cathode. "Uncalendared cathodes" were used as is, without any further processing steps. "Calendared cathodes" were calendared at room temperature in a secondary processing step. The cathodes were calendared between rollers with an applied force of 80 kN.

The cells contained a liquid electrolyte made of 0.5M LiTFSI and 0.2 M LiNO₃ in Dioxolane:Dimethoxyethane (1:1). Lithium metal foil 100 micron thick was utilised as the negative electrode (anode). The liquid electrolyte component was held within an inert separator placed between the electrodes.

The cells were cycled between 1.9 and 2.6V under an applied current equivalent to a rate of C/10 based upon the total sulfur content of the cathode, measured by mass, and assuming the theoretical capacity of sulfur to be 1672 mA h $g_{-1}$.)

Example 3

The cathodes utilised in Example 3 were the same as described in Example 2a. Cathodes were calendared at room temperature in a secondary processing step. The cathodes were calendared between rollers with an applied force of 80 kN.

A cell comprising a cathode as detailed in Example 2a and a liquid electrolyte containing a lithium salt at a concentration above 75% of its saturation concentration was produced. Said liquid electrolyte consisted of LiTFSI dissolved within Dioxolane (DIOX) to a molar concentration of 3 M. Lithium metal foil 100 micron thick was utilised as the negative electrode (anode). The liquid electrolyte component was held within an inert separator placed between the electrodes.

A comparable cell with electrolyte that dissolves polysulfides was also formed. Said cell comprised a cathode as detailed in Example 2a and a liquid electrolyte made of 0.5M LiTFSI in Dioxolane:Dimethoxyethane (1:1) was also formed. Lithium metal foil 100 micron thick was utilised as the negative electrode (anode). The liquid electrolyte component was held within an inert separator placed between the electrodes.

The cells were cycled between 1.0 and 3.0V under an applied current equivalent to a rate of C/10 based upon the total sulfur content of the cathode, measured by mass, and assuming the theoretical capacity of sulfur to be 1672 mA h g$_{-1}$.

Figure 3:
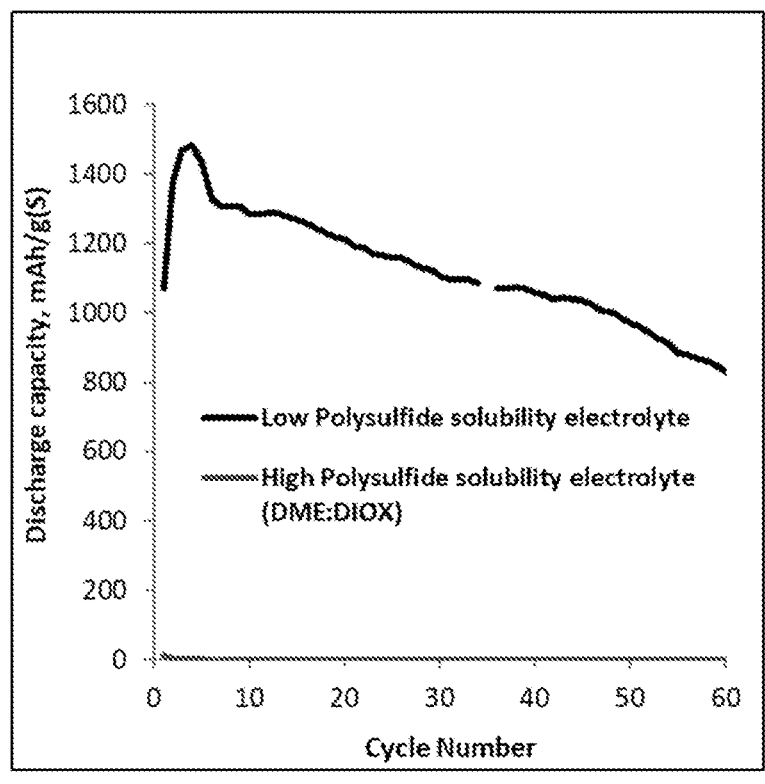
FIG. 3 shows electrochemical performance data of a cell in accordance with an embodiment of the invention in which a highly concentrated (low polysulfide solubility) electrolyte is employed, in comparison to a standard electrolyte.

FIG. 3 shows discharge capacity during cycling for the cell comprising highly concentrated electrolyte with corresponding low polysulfide solubility, in comparison to a standard electrolyte that dissolves polysulfides. Where a standard electrolyte that dissolves polysulfides is employed, no discharge capacity is observed during cycling.

Examples 1 and 3 (FIGS. 1 and 3) demonstrate the need for both a low polysulfide electrolyte in combination with a low porosity cathode with a high degree of interfacial contact between sulfur and carbon. In isolation, a high porosity "traditional" cathode will not cycle with high capacity with a low polysulfide solubility electrolyte (FIG. 1). Similarly, a low porosity cathode with a high degree of interfacial contact between sulfur and carbon will not cycle at all with a "conventional" high solubility electrolyte (FIG. 3). Both the low porosity cathode and low polysulfide solubility electrolyte are required to access high utilisation of active material for sustained cycling, with no polysulfide shuttle.

Example 4

Application of external pressure was achieved via clamping of cells between two stainless steel plates. Force was applied to the plates via screws tightened with a torque wrench. The torque applied to each screw was calibrated to applied pressure independently through use of a load cell. Cells were cycled under this setup to maintain applied force throughout cycling.

Figure 4A:
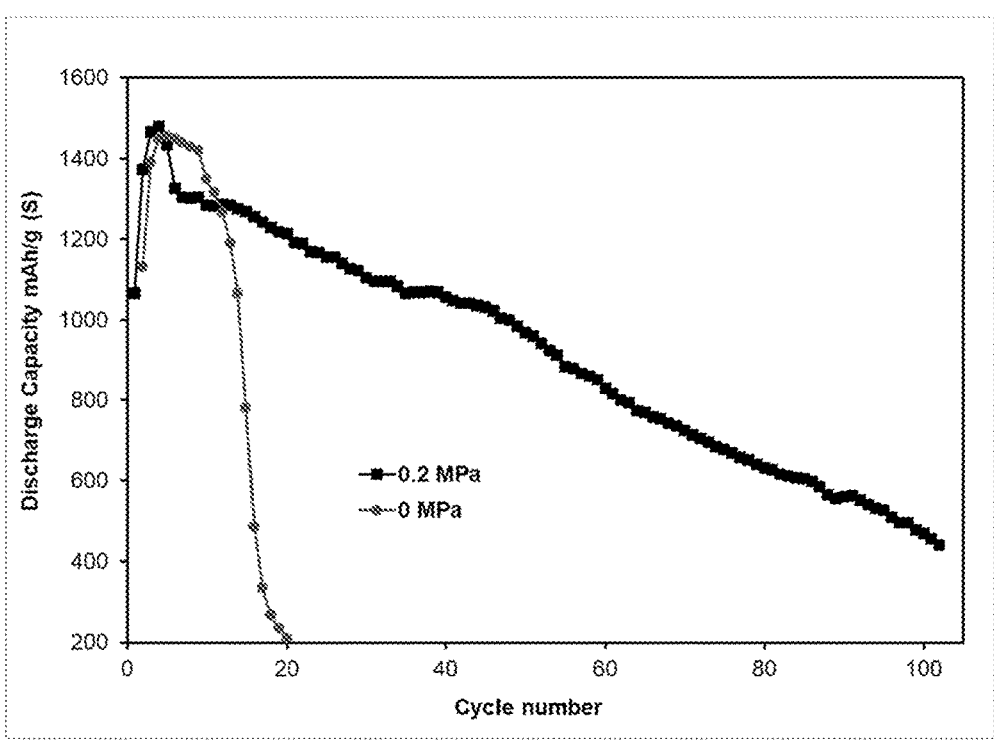
FIG. 4a shows electrochemical performance data of a cell in accordance with an embodiment of the invention in which a cell is subjected to a pressure of approximately 0.2 MPa during cycling.

FIG. 4a provides capacity data during cycling for a cell in accordance with the invention in which improved performance is shown when external pressure of 0.2 MPa is applied. FIG. 4a shows improvement of cycle life and reduction in capacity fade of the cell. This suggests the cathode performance is not negatively impacted by the application of external pressure, allowing improvement to Li-metal anode degradation and cycle life to be realised. Additionally, application of pressure attenuates the capacity fade by maintaining the integrity of the cathode during volume expansion on cycling. This further enhances cycle life of the cell.

Figure 4B:
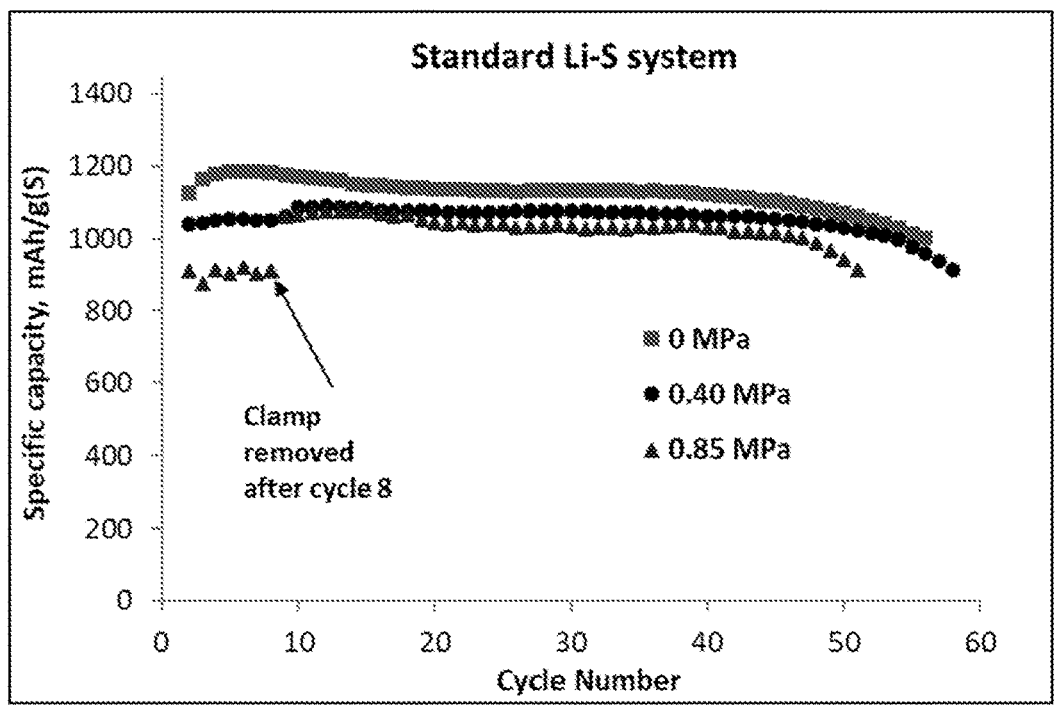
FIG. 4b shows electrochemical performance data of a standard, high porosity cathode under pressure.

FIG. 4b shows that application of pressure for a comparable lithium-sulfur system in which a standard high porosity cathode is used does not benefit from application of pressure. Cycling of conventional lithium-sulfur system in which a standard high porosity cathode cells under applied pressure can result in loss in capacity due to destruction of cathode structure.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An electrochemical cell comprising:
   i. an anode comprising an alkali metal or alkali metal alloy or silicon;
   ii. a cathode comprising a particulate mixture deposited on a current collector, said particulate mixture comprising electrochemically active sulfur material, wherein the particle size of the electrochemically active sulfur material is less than 5 μm, and electronically conductive carbon material, wherein the particle size of the carbon material is less than 5 μm, wherein the porosity of the cathode is less than 25%; and
   iii. an electrolyte comprising a lithium salt and having a lithium salt concentration of greater than or equal to 75% of its saturation concentration and a polysulfide solubility of less than 500 mM.

2. The electrochemical cell of claim 1, wherein the electrochemically active sulfur and electronically conductive carbon are present in the form of a composite material.

3. The electrochemical cell of claim 1 wherein the carbon material comprises carbon nanotubes, carbon nanofibers, graphite, graphene, reduced graphene oxide, carbon black, or any combination thereof.

4. The electrochemical cell of claim 1 wherein the sulfur material is selected from elemental sulfur or Li$_2$S.

5. The electrochemical cell of claim 1 wherein the cathode comprises additional electronically conductive material.

6. The electrochemical cell of claim 1 wherein the cathode further comprises an ionically conductive material.

7. The electrochemical cell of claim 1 wherein the electrolyte comprises a solvent comprising a linear ether, diethyl ether (DEE), tetrahydrofuran (THF), Dimethoxyethane (DME), Dioxolane (DIOX), Diglyme, dimethyl carbonate (DMC), ethyl methyl carbonate (EMC), ethylene carbonate (EC), propylene carbonate (PC), methyl formate (MF), ethyl formate (EF), methyl propionate (MP), ethyl acetate (EA) and methyl butyrate (MB), methyl ethyl ketone, acetonitrile (ACN), propionitrile (PN), isobutyronitrile (iBN), Dimethylformamide (DMF), Dimethylacetamide (DMAc), N-Methyl-2-pyrrolidone (NMP), Tetramethylurea (TMU), Dimethyl sulfoxide (DMSO), Trimethyl phosphate, Triethyl phosphate, Hexamethylphosphoramide, toluene, benzene, heptane, xylene, dichloromethane, or any combination thereof;

ionic liquids, fluorinated ethers, gels, or any mixture thereof;

and at least one alkali metal salt.

8. The electrochemical cell of claim 7 wherein the alkali metal salt comprises lithium salt comprising lithium hexafluoroarsenate $LiA_2F_6$, lithium hexafluorophosphate $LiPF_6$, lithium perchlorate $LiCLO_4$, lithium sulfate $Li_2SO_4$, lithium nitrate $LiNO_3$, lithium trifluoromethanesulfonate LiOTf, lithium bis(trifluoromethane)sulfonimide LiTFSI, lithium bis(fluorosufonyl)imide LiFSI, lithium bis(oxalate) borate LiBOB, lithium difluoro(oxalate)borate LiDFOB, lithium bis(pentafluoroethanesulfonyl)imide LiBETI, lithium 2-trifluoromethyl-4,5-dicyanoimidazole LiTDI, or any combination thereof.

9. The electrochemical cell of claim 1 wherein the electrolyte loading is less than 2 μL/mAh.

10. The electrochemical cell of claim 1 wherein the cathode further comprises a binder, wherein the binder is polyethylene oxide (PEO), polyvinylidene fluoride (PVDF), sulfonated polytetrafluoroethylene co-block polymer, poly-pyrrole, polythiophene, polyaniline, polyacetylene, poly-phenylene vinylene, poly(3,4-ethylenedioxythiophene), polyphenylene sulphide, gelatine, or any combination thereof.

11. The electrochemical cell of claim 1 wherein the cell is a lithium-sulfur cell.

12. An electrochemical cell assembly comprising at least one electrochemical cell of claim 1 and further comprising a means of applying pressure to the at least one electro-chemical cell or cells.

13. The electrochemical cell assembly of claim 12 wherein the means of applying pressure comprises at least one of a band, wrap or tubing positioned on the outside of the cell assembly.

\*  \*  \*  \*  \*